(12) United States Patent
Duvoisin, III

(10) Patent No.: US 8,310,236 B2
(45) Date of Patent: Nov. 13, 2012

(54) CONTINUOUS WAVE METAL DETECTOR

(75) Inventor: Herbert Duvoisin, III, Orlando, FL (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 521 days.

(21) Appl. No.: 12/562,809

(22) Filed: Sep. 18, 2009

(65) Prior Publication Data

US 2011/0068795 A1   Mar. 24, 2011

(51) Int. Cl.
  *G01V 3/08*   (2006.01)
  *G01V 3/10*   (2006.01)
(52) U.S. Cl. ............. 324/326; 324/329; 324/67; 706/20
(58) Field of Classification Search .................. None
  See application file for complete search history.

(56) References Cited

U.S. PATENT DOCUMENTS

| | | | |
|---|---|---|---|
| 5,592,170 A | 1/1997 | Price et al. | |
| 6,853,194 B2 | 2/2005 | Nelson et al. | |
| 6,967,574 B1 | 11/2005 | Nelson | |
| 7,362,260 B2 | 4/2008 | Cloutier et al. | |
| 7,432,715 B2 | 10/2008 | Stamatescu | |
| 7,532,127 B2 * | 5/2009 | Holman et al. | ............ 340/686.1 |
| 7,912,698 B2 * | 3/2011 | Statnikov et al. | ................. 704/8 |
| 2008/0036462 A1 | 2/2008 | Schiano | |
| 2008/0054893 A1 | 3/2008 | Humphreys et al. | |
| 2009/0195435 A1 | 8/2009 | Kapilevich et al. | |

OTHER PUBLICATIONS

International Search Report and Written Opinion for International Application No. PCT/US2010/049131, mailed Feb. 7, 2011, 12 pages.

* cited by examiner

*Primary Examiner* — Paresh Patel
(74) *Attorney, Agent, or Firm* — Fish & Richardson P.C.

(57) ABSTRACT

A training set including a target object set and a clutter object set is accessed. It is determined that the training set includes multiple types of targets or multiple types of clutter. The target feature value of a type of target is compared with the clutter feature value. The type of target is associated with the non-target object based on the comparison. A classifier is trained using the target feature value and the clutter feature value of the associated type of target and the non-clutter object. A feature value associated with an unknown object is applied to multiple classifiers to generate a set of metrics for the unknown object. The metrics are aggregated into an overall metric. Whether the unknown object is included in the target set is determined based on the overall metric.

8 Claims, 9 Drawing Sheets

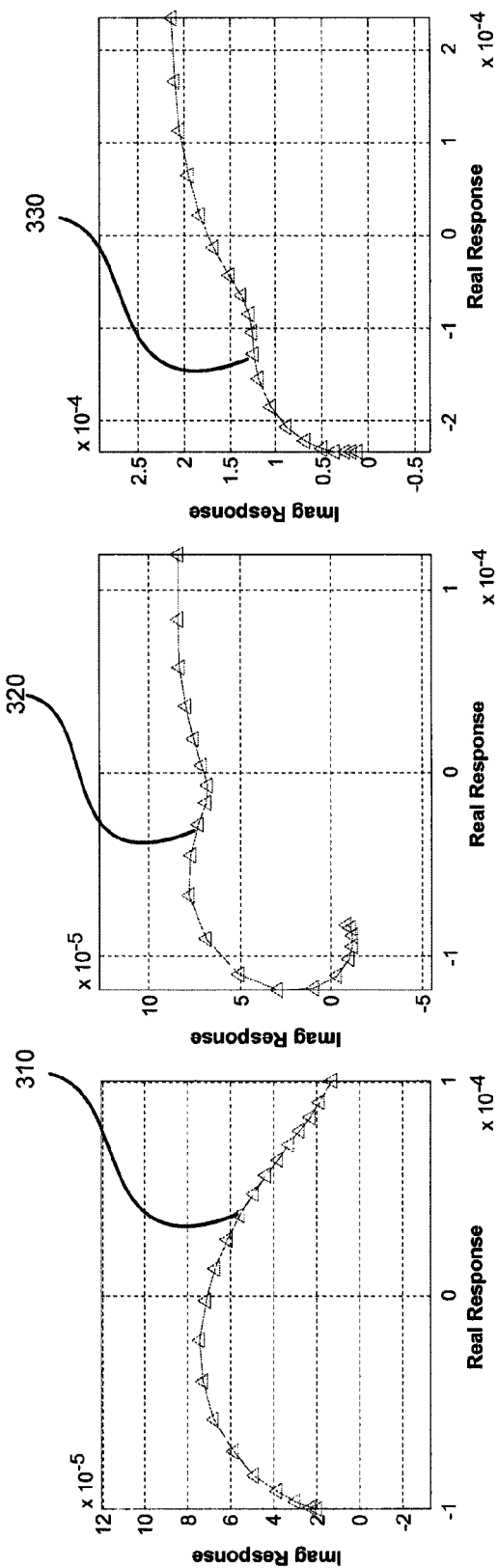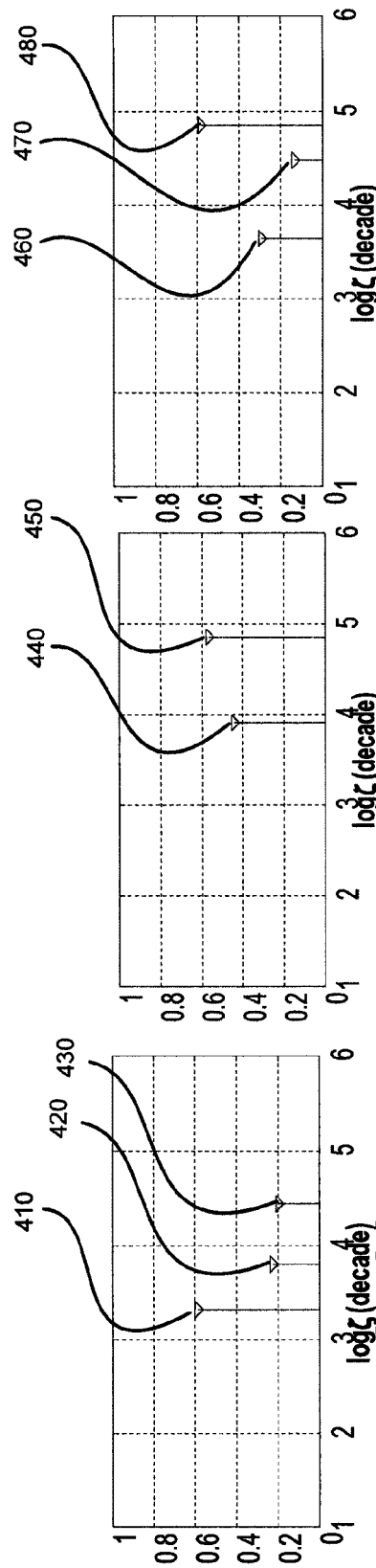

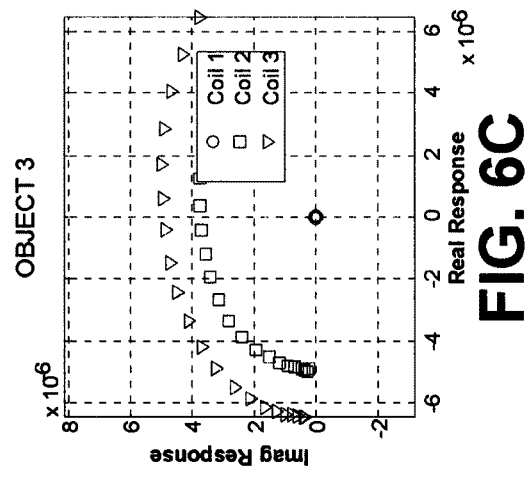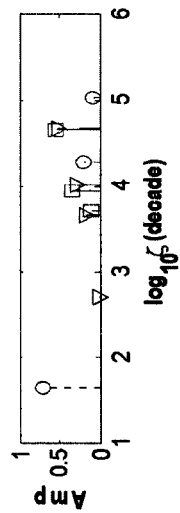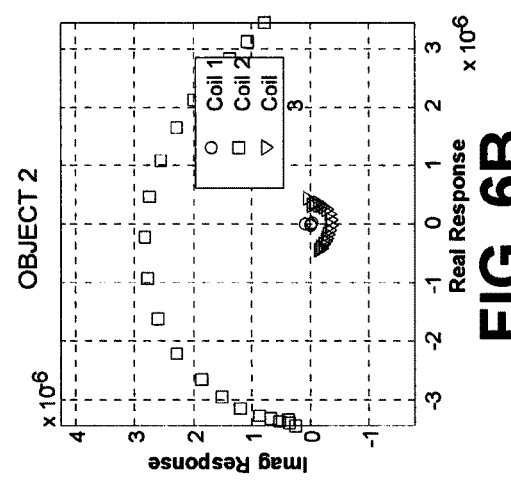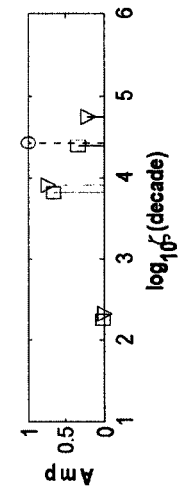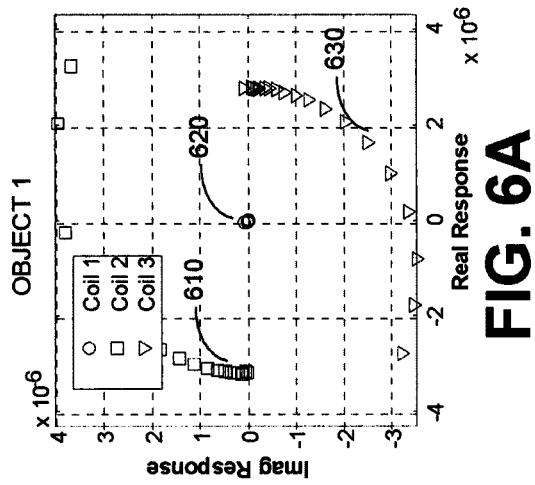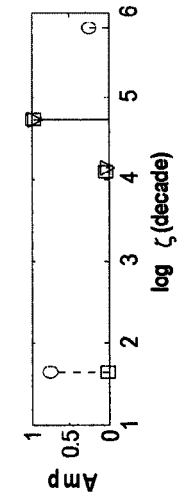

CONTINUOUS WAVE METAL DETECTOR

TECHNICAL FIELD

This disclosure relates to feature extraction from an orientation-independent signature.

BACKGROUND

A large percentage of land mines contain some amount of metal. Many versions of mines use metal for firing pins, shrapnel, and portions of the casing. If a mine has a sufficient quantity of a detectable metal, that mine can be found using a metal detector.

SUMMARY

In one general aspect, a first magnetic field is produced in the vicinity of an object such that a current is induced in the object. The object has an orientation relative to a direction of propagation of the first magnetic field. Quadrature and in-phase data representing a second magnetic field produced by the current induced in the object is sensed. The sensed data is fit to a two-dimensional signature to a model of an object. A parameter that is independent of the orientation of the object relative to the first magnetic field is generated from the fitted data. A feature of the object is extracted from the parameter. Whether the object is an object of interest is determined based on the feature.

Implementations may include one or more of the following features. Extracting a feature of the object may include determining an amplitude of the second magnetic field based on the quadrature and in-phase data, and determining a frequency of the second magnetic field based on the quadrature and in-phase data. A first frequency value and a second frequency value may be identified from the determined frequency, and a first amplitude value and a second amplitude value may be identified from the determined amplitude. The extracted feature may include a ratio of the first frequency value and the second frequency value and a ratio of the first amplitude value and the second amplitude value. The first frequency and the second frequency may be the two highest frequencies included in the determined frequency, and the first amplitude and the second amplitude may be the two highest amplitudes included in the determined frequency. The first amplitude may be an amplitude associated with the first frequency and the second amplitude may be an amplitude associated with the second frequency. The object may include an object of interest and a clutter object that is disposed between a sensor that produces the first magnetic field and the object of interest. A distance between the object and a sensor that produces the first magnetic field may be estimated. The object of interest may be a land mine. The object of interest may be a particular type of land mine. The object of interest may be a metallic portion associated with an incendiary device.

In another general aspect, a training set including a target object set and a clutter object set is accessed. The target object set includes a target associated with a target feature value and the clutter object set includes a non-target object associated with a clutter feature value. It is determined that the training set includes multiple types of targets or multiple types of clutter. The target feature value of a type of target is compared with the clutter feature value. The type of target is associated with the non-target object based on the comparison. A classifier is trained using the target feature value and the clutter feature value of the associated type of target and the non-clutter object such that the classifier produces a metric that indicates that an object associated with the type of target is a target. Multiple classifiers are generated. The multiple classifiers include the trained classifier. A feature value associated with an unknown object is applied to the multiple classifiers to generate a set of metrics for the unknown object. The metrics are aggregated into an overall metric. Whether the unknown object is included in the target set is determined based on the overall metric.

Implementations may include one or more of the following features. Aggregating the metrics into an overall metric may include summing the metrics included in the set of metrics. Prior to summing the metrics, the metrics may be normalized. The multiple classifiers may include at least two different types of classifiers. The clutter set may include data representing multiple different types of soils. The target set may include data representing multiple different types of land mines. Comparing the target feature value of a type of target with the clutter feature value may include determining a measure of similarity between the target feature value and the clutter feature value, and associating the type of target with the non-target object based on the comparison may include associating the type of target and the non-target object when the measure of similarity is below a threshold value.

Implementations of any of the techniques described above may include a method, a process, a system, a device, an apparatus, or instructions stored on a computer-readable medium. The details of one or more implementations are set forth in the accompanying drawings and the description below. Other features will be apparent from the description and drawings, and from the claims.

DESCRIPTION OF THE DRAWINGS

FIGS. 3A-3C and 6A-6C are example Argand diagrams of quadrature and in-phase data measured by a continuous wave metal detector.

FIGS. 4A-4C and 7A-7C are example outputs from a three-dimensional model of an object.

DETAILED DESCRIPTION

Techniques for identifying an object of interest, such as an explosive or contraband. More particularly, techniques for determining whether an object detected by a sensor is an object of interest are disclosed. The sensor may be a continuous-wave metal detector (CWMD), and the techniques may include analyzing data from the CWMD to determine if the detected object is an object of interest such as, for example, a weapon, an explosive, or a buried munition such as a land mine or unexploded ordinance. The CWMD may be referred to as a digital metal detector. The data produced by the CWMD in response to detecting an object may be considered to be the electromagnetic induction (EMI) response of the object. The EMI response has characteristics that allow the object to be classified as an object of interest or, perhaps, identified as a particular type of object. As discussed in greater detail below, the EMI response may be processed to determine a signature of the detected object that is independent of the orientation, or angle, that the object has with respect to the sensor. The orientation-independent signature may be analyzed to extract features that allow the object to be classified as an object of interest or an object that is not of interest.

Objects of interest may be referred to as targets, and objects that are not of interest may be referred to as non-targets or clutter. The clutter may include a background material in which an object of interest is embedded, overlayed by, or otherwise partially or completely obscured. For example, the clutter may include soil in which a landmine is buried or foam padding in footwear in which an incendiary device is hidden.

The objects encountered by the sensor may include various and distinct types of targets and/or clutter. In these instances, multiple classifiers may be generated, with each classifier being trained using a data from a target-clutter grouping made based on a measure of similarity between the target and clutter. Data from an unknown object may be input to more than one of the multiple classifiers to determine an overall, or aggregated, metric that indicates whether the unknown object is more likely to be a target or more likely to be a clutter object. The aggregated metric may be, for example, an aggregation of values associated with a particular feature that is extracted from the orientation-independent signature or the aggregated metric may be a confidence value derived from one or more feature values. Applying more than one classifier to the data associated with the unknown object may result in improved performance as compared to inputting the data into one classifier. For example, applying more than one classifier may result in a higher probability of detection and a lower false alarm rate than obtained from a technique that relies on a single classifier. In some examples, a ten-fold improvement may be realized.

Figure 1B:
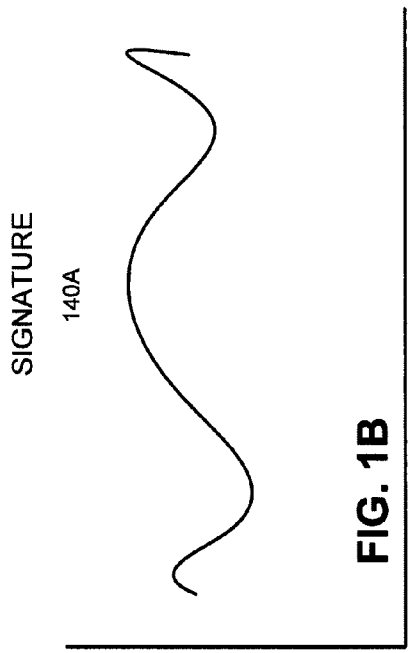
FIGS. 1B and 2B illustrate an example signature of the target that is independent of an orientation of the target relative to the sensor.
Figure 2B:
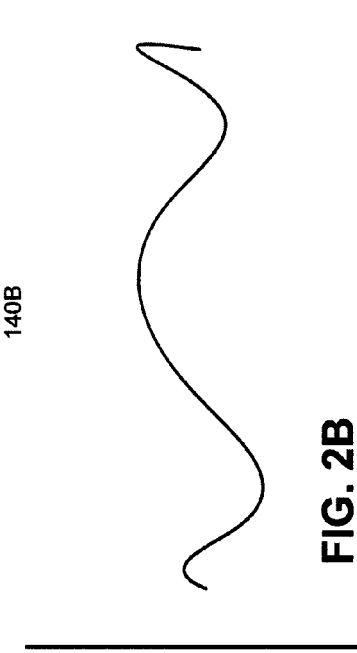
Figure 1A:
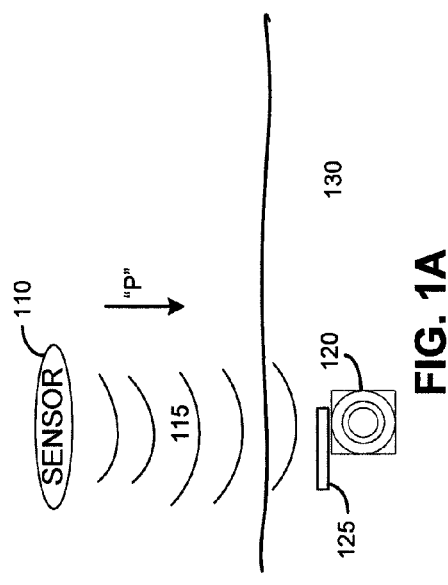
FIGS. 1A and 2A illustrate an example of a sensor interacting with a target that is embedded in clutter.
Figure 2A:
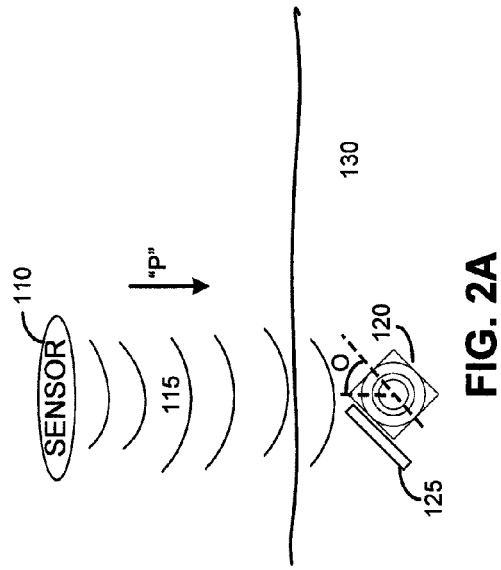

Referring to FIGS. 1A and 2A, a sensor 110 emits radiation 115 along a direction of propagation "p" towards a target 120. In the examples shown in FIGS. 1A and 2A, the target 120 is partially obscured by a clutter object 125 and the target 120 is buried within a background 130. In this example, the target 120 is buried beneath the surface of the ground, the clutter object 125 is a plate, and the background 130 is soil. The sensor 110 detects radiation produced by interactions between the radiation 115, the target 120, the clutter object 125, and the background 130. The sensor 110 produces data based on the interactions, and the data may be analyzed to produce a signature 140A that represents the target 120 having an orientation as shown in FIG. 1A and a signature 140B that represents the target 120 having a different orientation as shown in FIG. 2A. Because the signature is orientation-independent, signatures 140A and 140B are the same or nearly the same.

The sensor 110 may be a metal detector that produces an electromagnetic (EM) field such that a current is induced in metallic portions of the target 120, the clutter object 125, and the background 130. The sensor 110 may be a multi-frequency continuous-wave metal detector (CWMD) that transmits sensor signals of multiple frequencies through a dedicated transmit coil (not shown) and continuously receives all of the frequencies in a second receive coil (not shown). Thus, the response of the target 120 to multiple frequencies is sensed simultaneously, or nearly simultaneously, by the sensor 110. The current induced in the metallic portions of the target 120, the clutter object 125, and the background 130 produce a second magnetic field that is sensed by the sensor 110. In implementations in which the sensor 110 is a CWMD, the sensor 110 senses quadrature and in-phase (I&Q) data that represents the second magnetic field. As discussed below, sensing I&Q data allows determination of a signature of the target 120 that is independent of the orientation "o" of the target 120 relative to the sensor 110. Thus, the signature is the same, or substantially the same, for the target 120 regardless of the position or orientation of the target 120 relative to the sensor 110.

Referring to FIG. 2A, the target 120 has an orientation "o" with respect to the direction of propagation "p" that is rotated about 90-degrees relative to the arrangement of the sensor 110 and target 115 shown in FIG. 1A. In this example, the orientation of the target 115 changed. However, the orientation of the target 115 relative to the sensor 110 may change as a result of the positioning of the sensor 110 changing and/or as a result of the direction of propagation "p" of the radiation 115 changing.

The raw quadrature and in-phase (I&Q) data sensed by the sensor 110 is different for the target 120 depending on the orientation of the target 120 relative to the sensor 110 and/or the direction of propagation "p" of the radiation 115. However, processing of the quadrature and in-phase data allows determination of an orientation-independent signature. Thus, and as discussed in greater detail with respect to FIG. 9, the signatures 140A and 140B are orientation-independent signatures that may be used to determine features to distinguish the target 120 from the clutter object 125. In contrast to techniques that do not account for the orientation of the target 120, determining an orientation-independent signature allows for the extraction of more robust features that may identify a particular object as being a clutter object or a target object more accurately.

Figure 12A:
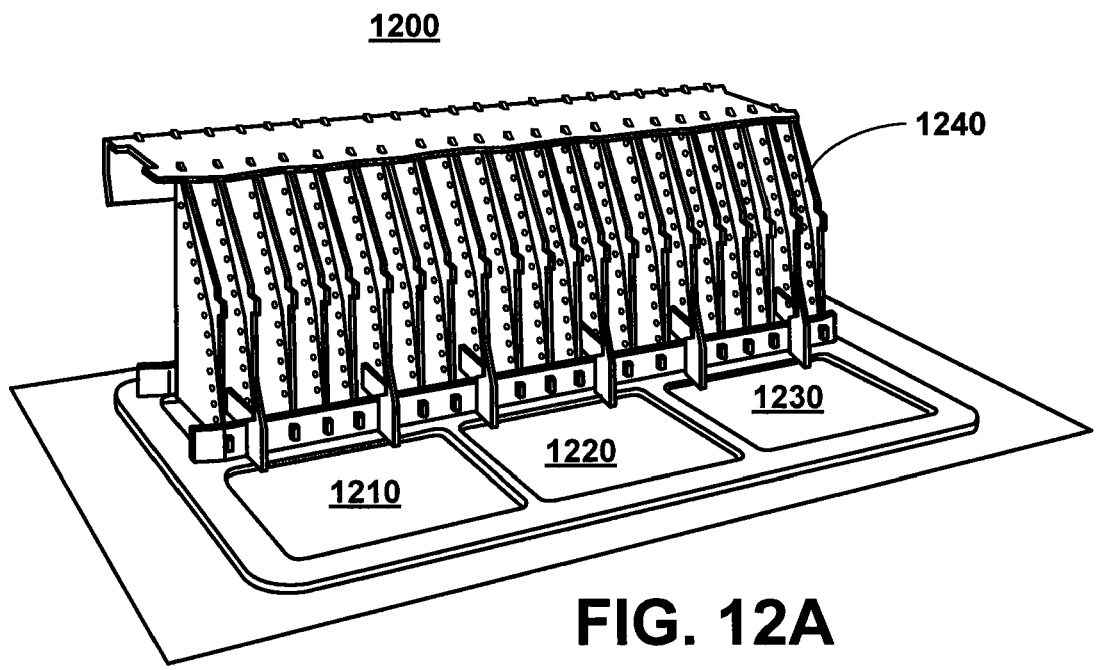
FIGS. 12A and 12B show an example of an integrated sensor head.
Figure 12B:
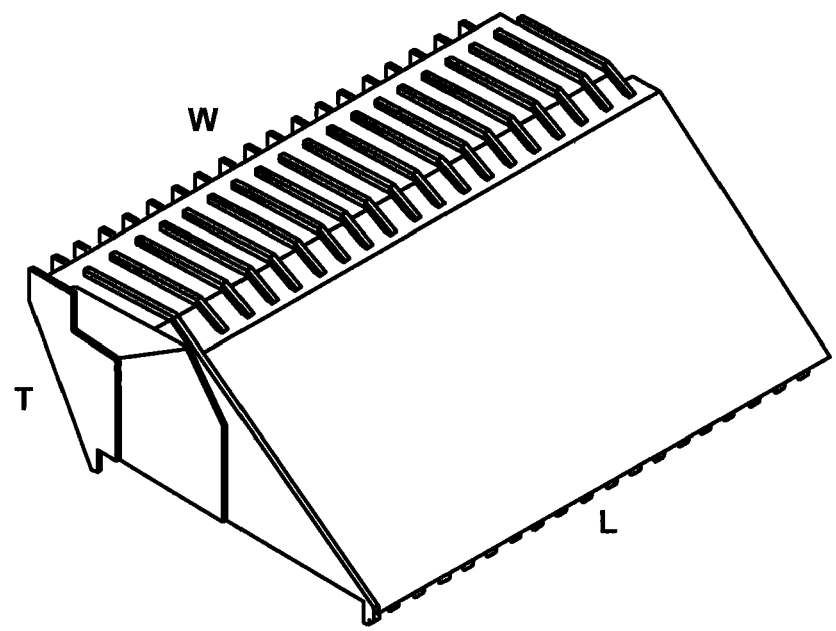

In some examples, the sensor 110 includes a continuous wave metal detector (CWMD) and a ground penetrating radar (GPR) that are integrated into a single sensor head. An example of such an integrated sensor head is shown in FIGS. 12A and 12B. In these examples, data from the GPR may be analyzed for features that indicate that the target 120 is an object of interest and that the clutter object 125 is not an object of interest. GPR relies on differences in dielectric contrast to detect objects whereas the CWMD relies on the detection of a magnetic field caused by a current induced in a metal object. Thus, because the GPR and CWMD rely on different phenomenology, the data produced by the GPR and the CWMD may compliment each other. As a result, when used together, the GPR and CWMD have the potential to improve the overall performance of the sensor 110.

Referring to FIGS. 3A-3C, 4A-4C, and 5 example data used to discriminate between targets and clutter is shown. The example shown in FIGS. 3A-3C, 4A-4C, and 5 includes data from a single channel of a CWMD. However, in other examples, data from additional channels of the CWMD may be used.

FIGS. 3A-3C show raw I&Q data received from the CWMD. The I&Q data represents the EMI response of keys (shown at 310 in FIG. 3A), a shoe (shown at 320 in FIG. 3B), and the keys placed inside of the shoe (shown at 330 in FIG. 3C). An EMI response has a real portion and an imaginary portion, with the real portion representing the quadrature component of the response and the imaginary portion representing the phase of the response. In FIGS. 3A-3C, the EMI response is plotted as an Argand diagram, which represents the imaginary portion (phase) as a function of the real portion (quadrature) with frequency as a parameter. Thus, in FIGS. 3A-3C, the imaginary portion of the EMI responses 310, 320, and 330 of, respectively, the keys, the shoe, and the keys in the shoe, are shown on the y-axis and the real portion of the responses 310, 320, and 330 are shown on the x-axis. Argand diagrams may be used to visualize a characteristic shape for an object. As the distance between the CWMD and the object varies, the amplitude of the curve changes, but the shape of the curve changes little, if at all. In the example shown in FIGS. 3A-3C, there is a constant distance between the CWMD and the object, and the response is measured on one channel of the CWMD, thus, only one curve is shown on each of the FIGS. 3A-3C. However, in other examples, the distance between the object and the sensor may vary, and, in these other examples, the amplitude of the EMI response also changes.

Although the shape of the EMI response curve on the Argand diagram changes little, if at all, due to distance between the detected object and the sensor, the shape of the curve may change as the orientation of the object with respect to the sensor varies. To remove the effect of orientation, the two-dimensional signature (such as those shown in FIGS. 3A-3C) is used to generate a three-dimensional orientation-independent template of an object. The template may be a model of a physical object that describes the physical object in mathematical terms. For example, the template may be a model that is defined by a set of parameters, where each parameter is associated with one or more numerical values. The three-dimensional template allows the detected object (the keys, the shoe, and the keys and the shoe in this example) to be represented using vectors that represent the shape and material of the metallic portion of the detected object. The vectors represent amplitude and frequency and are independent of the orientation of the object with respect to the CWMD. The frequency vector represents the relaxation rate of the signature measured after being influenced by the magnetic field produced by the CWMD. The amplitude and frequency vectors may be analyzed to extract features associated with the detected object that are orientation-independent. The features may be used to determine whether the detected object is more likely (or less likely) to be a target object or more likely (or less likely) to be a clutter object.

Referring to FIGS. 4A-4C, example outputs of the three-dimensional model are shown. FIG. 4A shows the output of the model for the keys, FIG. 4B shows the output of the model for the shoe, and FIG. 4C shows the output of the model for the keys inside of the shoe. The examples shown in FIGS. 4A-4C show the values of the orientation-independent amplitude and frequency vectors derived from the three-dimensional model with amplitude being plotted as a function of frequency for each object. Because the vectors are orientation-independent, using the values of the vectors for feature extraction results in more accurate results than techniques that do not account for the relative orientations of the target and the sensor. Referring to FIG. 4A, the model used for the keys produces three vectors, 410, 420, and 430, each associated with a frequency and an amplitude. Referring to FIG. 4B, the model used for the shoe produces two vectors, 440 and 450 having different values than the vectors 410, 420, and 430 associated with the keys. The vectors 440 and 450 are characteristic of the shoe, and the metal components within the shoe. The vectors 440 and 450 may be used to distinguish the shoe from other objects, or perhaps, to identify the shoe as a shoe object or belonging to a class of footwear objects.

Referring to FIG. 4C, placing the keys in the shoe produces another set of vectors 460, 470, and 480. The shoe represented in FIGS. 3B and 4B may be considered to be a background object in which the keys of FIGS. 3A and 4A are obscured. Comparing the vectors 410, 420, and 430, associated with the key, and the vectors 440 and 450, associated with the shoe, shows that the presence of the keys inside of the shoe shifts, or otherwise modifies, the vectors 410, 420, and 430 associated with the key because of the presence of the shoe. An analytic comparison of the vectors derived for a particular object may remove the effects of a background that is present in the vicinity of the object. For example, the ratio of the amplitudes of two vectors derived for a particular object (such as the keys) may remain constant, or relatively constant, even if the individual amplitudes vary due to the presence of an obscuring clutter item or background (such as the shoe).

Figure 5:
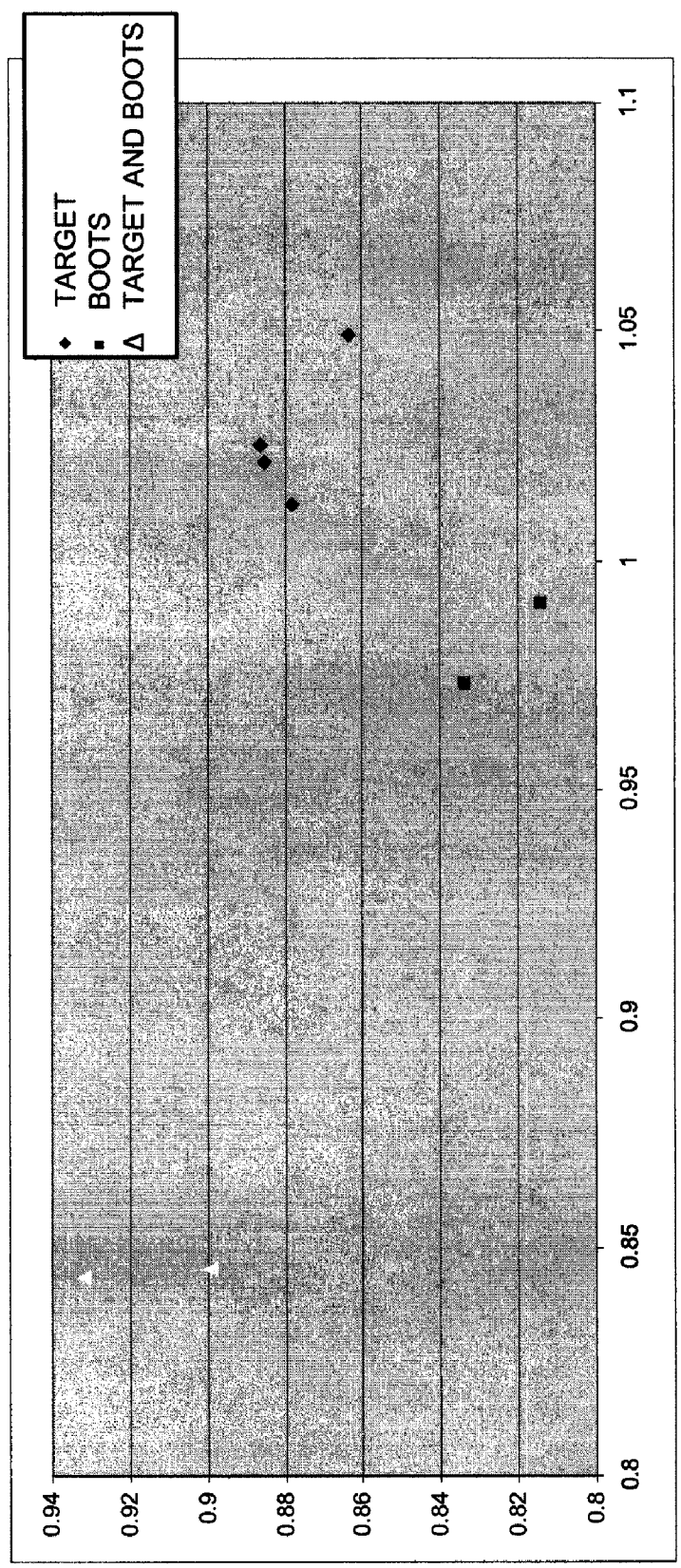
FIGS. 5 and 8 are example scatter plots of feature values associated with targets and clutter.
Figure 8:
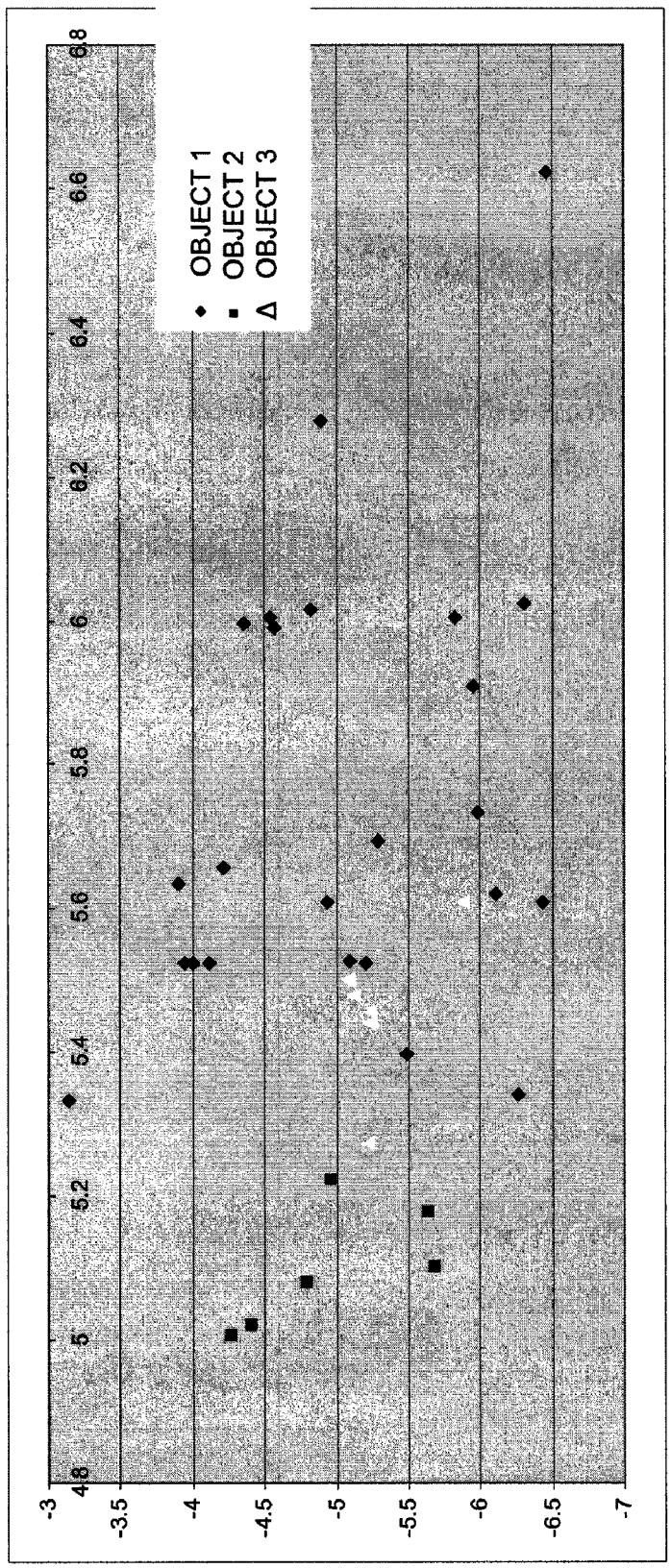

Referring to FIG. 5, a plot of the values of extracted features is shown for the keys, the shoe, and the shoe with the keys. As shown in this example, the keys, shoes, and the key with the shoes separate in feature space such that a decision surface (not shown) that passes between the clutter objects (the shoe) and the target object (the keys) and separates the clutter and targets may be determined. Thus, and discussed in more detail in FIGS. 4A-4C and 9, features may be extracted from the orientation-independent vectors, and these features may be used for discriminating between targets and clutter, and, perhaps, for classifying objects into various classes of objects. The values of the x-axis and the y-axis reflect values of the extracted features. The extracted features may include features related to the frequency vector and the amplitude vector. In other examples, the features may be based on a phase detected by the CWMD sensor.

Referring to FIGS. 6A-6C, 7A-7C, and 8, another example of data used to discriminate between targets and clutter is shown. In contrast to the example shown in FIGS. 3A-3C, 4A-4C, and 5, the example shown in FIGS. 6A-6C, 7A-7C, and 8, data from three channels (or coils) of the CWMD is illustrated. FIG. 6A shows the EMI response 610 of an "object 1" for the second channel, the EMI response 620 of the "object 1" for the first channel, and the EMI response 630 of the "object 1" for the third channel. In this example, the second channel is turned OFF, or is not over the "object 1," thus there is no EMI response measured at the second channel. As shown in FIG. 6A, the EMI responses 610 (from the second channel) and 630 (from the third channel) have a semi-circular shape, although the responses 610 and 630 are flipped relative to one another. The differences between the responses 610 and 630 may be caused by the second and third coil having different orientations relative to the target. EMI responses of "object 2" are shown in an Argand diagram in FIG. 6B, and EMI responses of "object 3" are shown in an Argand diagram in FIG. 6C. In the example of FIG. 6C, the "object 3" represents the "object 2" placed on top of the "object 1" such that "object 1" is between the sensor and "object 2."

Similarly to the example discussed in FIGS. 4A-4C, the EMI responses of the object 1, object 2, and object 3 are used to generate three-dimensional models that in turn generate orientation-independent vectors for each of the objects. The orientation-independent vectors are plotted in FIGS. 7A-7C, and the features extracted from the orientation-independent vectors are shown in the scatter plot of FIG. 8.

Although a CWMD is used to generate the data used in the examples above, in other examples additional and/or different sensors may be used.

Figure 9:
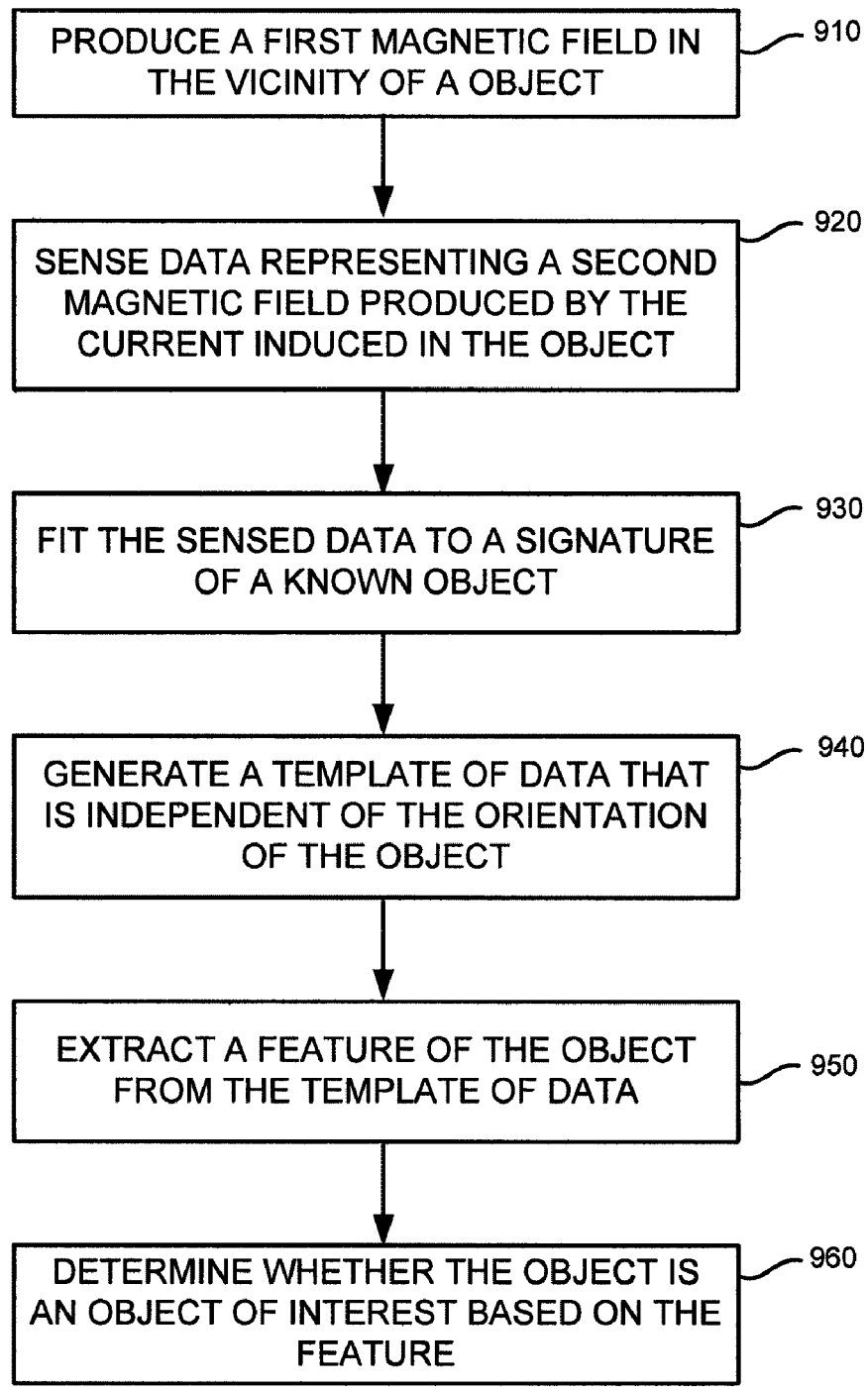
FIG. 9 is an example process for determining a signature of an object.

Referring to FIG. 9, a process 900 for determining a signature of an object is shown. The process 900 may be performed by a processor associated with a sensor such as the sensor 110 discussed with respect to FIG. 1. The processor may be integrated with the sensor or the sensor may be separate from the processor. In examples in which the sensor is separate from the processor, the processor and the sensor may be in communication while the sensor is operating such that the processor receives data from the sensor and analyzes the data as the sensor operates. In the example discussed below, the sensor is a metal detector capable of sensing quadrature and in-phase data, such as a CWMD. However, in other examples, the sensor may include a different or additional sensor.

A first magnetic field is produced in the vicinity of an object (910). The object has an orientation relative to a direction of propagation of the first magnetic field and the first magnetic field induces a current in the object. Quadrature and in-phase data representing the second magnetic field is sensed as a current arising in a coil of the sensor (920). The sensed data is fit to a two-dimensional signature (930). The two-dimensional signature may be a signature that represents the quadrature data as a function of the in-phase data such as those shown in FIGS. 3A-3C and FIGS. 6A-6C.

A template of data that is independent of the orientation of the object relative to the first magnetic field is generated (940). The template of data also may be independent of an orientation of the object relative to a direction of propagation of radiation produced by the sensor and directed toward the target. The template of data may be a template that represents a three-dimensional object associated with a two-dimensional signature that matches, or closely matches, the two-dimensional signature found in (930). The three-dimensional object may be found from among multiple candidate three-dimensional object by iterating through the potential three-dimensional space of I & Q data that could project into the two-dimensional signature found in (930). The number of candidate objects may be reduced by removing non-logical values (non-positive values) until the iteration converges to a unique candidate three-dimensional model that projects the two-dimensional I & Q signature found in (930) in real (positive) values.

In the model, the shape and material of each of the metallic objects is described using vectors representing amplitude and frequency, where frequency is the relaxation rate of the signature measured after being influenced by the electromagnetic field produced by the sensor. Because the three-dimensional model is a close approximation to the detected object, the orientation of the detected object relative to the sensor may be accounted for, and the vectors are independent of the relative orientation of the detected object and the sensor. The vectors may have frequency and amplitude values similar to those shown in FIGS. 4A-4C and FIGS. 7A-7C.

A feature of the object is extracted from the three-dimensional template (950). The feature of the object is extracted from data that is derived from, or produced by, the three-dimensional template, such as the amplitude and frequency vectors discussed above.

Extracting a feature of the object may include determining an amplitude of the second magnetic field and determining a frequency of the second magnetic field or the relaxation rate of the detected object after being influenced by the electromagnetic field produced by the sensor. Extracting a feature of the object may include identifying, from the frequency vector, a first frequency value and a second frequency value. Extracting a feature of the object may include identifying, from the amplitude vector, a first amplitude value and a second amplitude value. In some examples, the feature may include a ratio of the first frequency value and the second frequency value and a ratio of the first amplitude value and the second amplitude value. Using the ratio instead of the raw frequency and amplitude values as the extracted feature values may remove noise from the value of the feature, particularly if the noise is common to all frequency values and/or all amplitude values. The first and second frequency values may be the two highest frequency values, and the first and second amplitude values may be the two highest amplitude values. The first and second amplitudes may be the amplitudes respectively associated with the first and second frequencies.

In some examples, a distance between the detected object and the sensor may be estimated. The estimated distance between the detected object and the sensor may be used to normalize the data collected by the sensor to a constant, arbitrary distance before extracting the feature values of the amplitude and frequency. Determining the distance between the detected object and the sensor allows the extraction and/or use of additional features. For example, the distance itself may be used as a feature.

Whether the object is an object of interest is determined based on the extracted features (960). To determine whether the object is an object of interest, the extracted feature values may be input into one or more classifiers that are configured to produce a confidence value that may assume a range of numerical values, each of which indicates whether the object is more likely to be a target object or a clutter object. In some examples, the classifier is configured to produce a confidence value that is one of a discrete number of numerical values, each of which indicate whether the object is an object of interest (a target) or an object not of interest (clutter).

Although in the example process 900 discussed with respect to FIG. 9, the process includes determining the template of data that is independent of orientation (such as the three-dimensional object), this is not necessarily the case. In some implementations, data produced by the three-dimensional object is received by the processor from a pre-generated or separately generated template of data.

Figure 10:
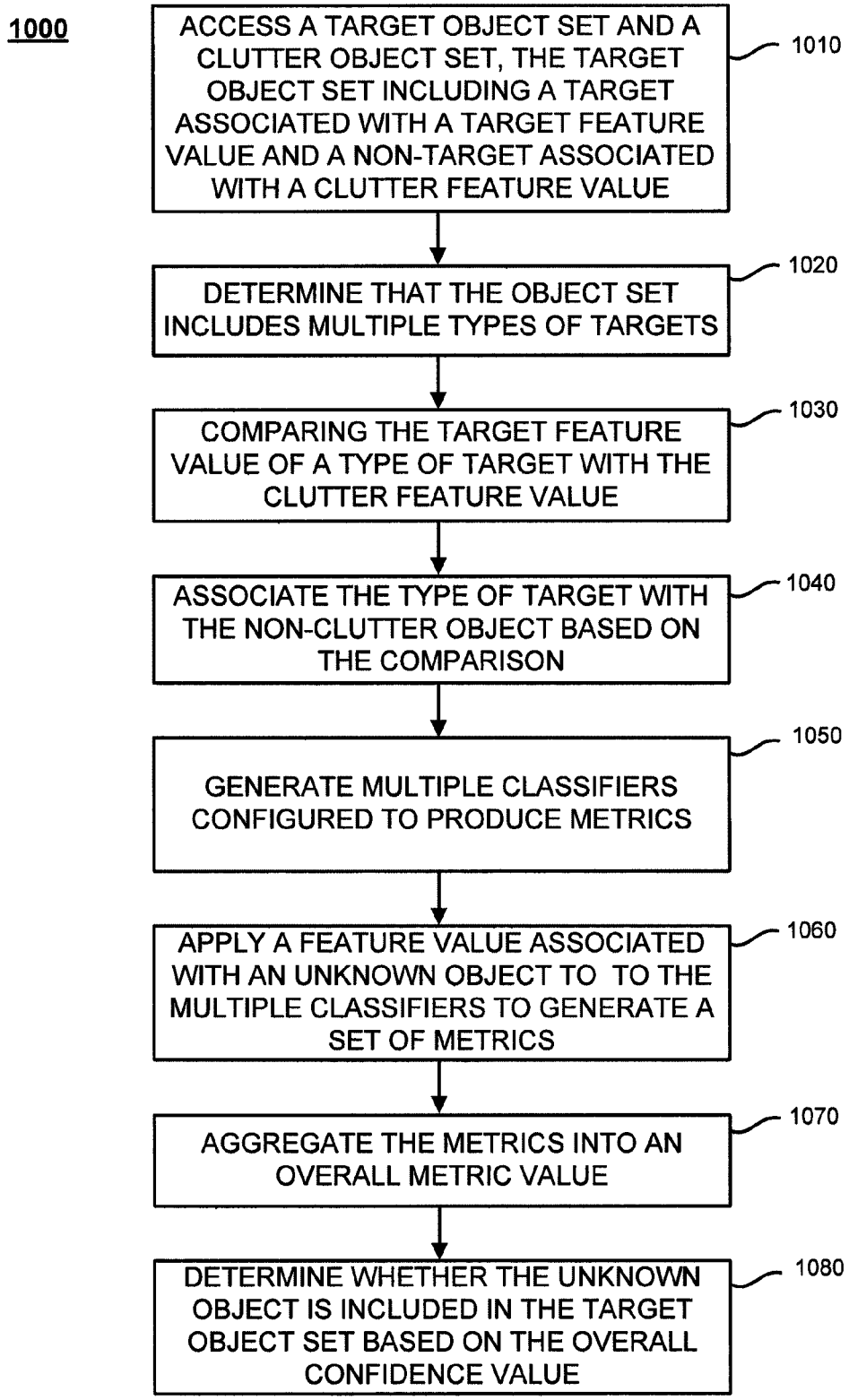
FIG. 10 is an example process for discriminating among objects.

Referring to FIG. 10, an example process 1000 for discriminating among objects is shown. The process 1000 may be performed using data produced by the process 900 discussed with respect to FIG. 9. The process 1000 may be performed by a processor integrated with a sensor such as the sensor 110 or the processor may be separate from the sensor. In examples in which the sensor is separate from the processor, the processor and the sensor may be in communication while the sensor is operating such that the processor receives data from the sensor, discriminates, and classifies the data detected by the sensor as the sensor operates.

In the discussion below, multiple classifiers are trained using data that is known to be associated with targets and data that is known to be associated with clutter. The training set includes multiple and distinct types of targets and/or multiple and distinct types of clutter. Each target type is paired, or grouped, with the type, or types, of clutters that are most closely associated with the target type. The grouped data is used to train a particular classifier. As a result, this classifier is tuned for the target-clutter pairing, or grouping, such that the classifier produces a metric or confidence value indicating that an object that has a feature similar to that of the targets in the target set is likely, or very likely, to be a target object. The other multiple classifiers are similarly trained using other clutter-target groupings or paring. Once trained, each of the classifiers produce, in response to an input representing a value associated with an object of unknown classification, a metric or confidence value that indicates whether the unknown object is more likely to be clutter or more likely to be a target. The metric of all of the classifiers may be aggregated to produce an overall metric for the unknown object. The overall confidence may produce a more accurate determination of whether the unknown object is a target as compared to using a single classifier.

In greater detail, a target object set and a clutter object set are accessed (1010). The target object set includes a target that is associated with a target feature value and a non-target that is associated with a clutter feature value. For example, the target and clutter feature values may be a ratio of the frequency of relaxation of a metallic object detected by a CWMD sensor.

Whether the object set includes multiple types of targets is determined (1020). The target object set may include multiple and distinct types of targets (such as different types of landmines, different types of trace chemicals used in the production of explosives, or different types of metallic pins used to ignite an incendiary device). Similarly, the clutter object set may include multiple and distinct types of clutter (such as different types of soils in which landmines are buried, different innocuous solids or liquids on which trace chemicals reside, or different types of footwear in which incendiary devices are embedded). Continuing with the example in which a CWMD sensor is used for landmine detection, the sensor may encounter multiple different types of landmines, each having a different shape, size, and/or metal content, buried within different types of soils.

Figure 11:
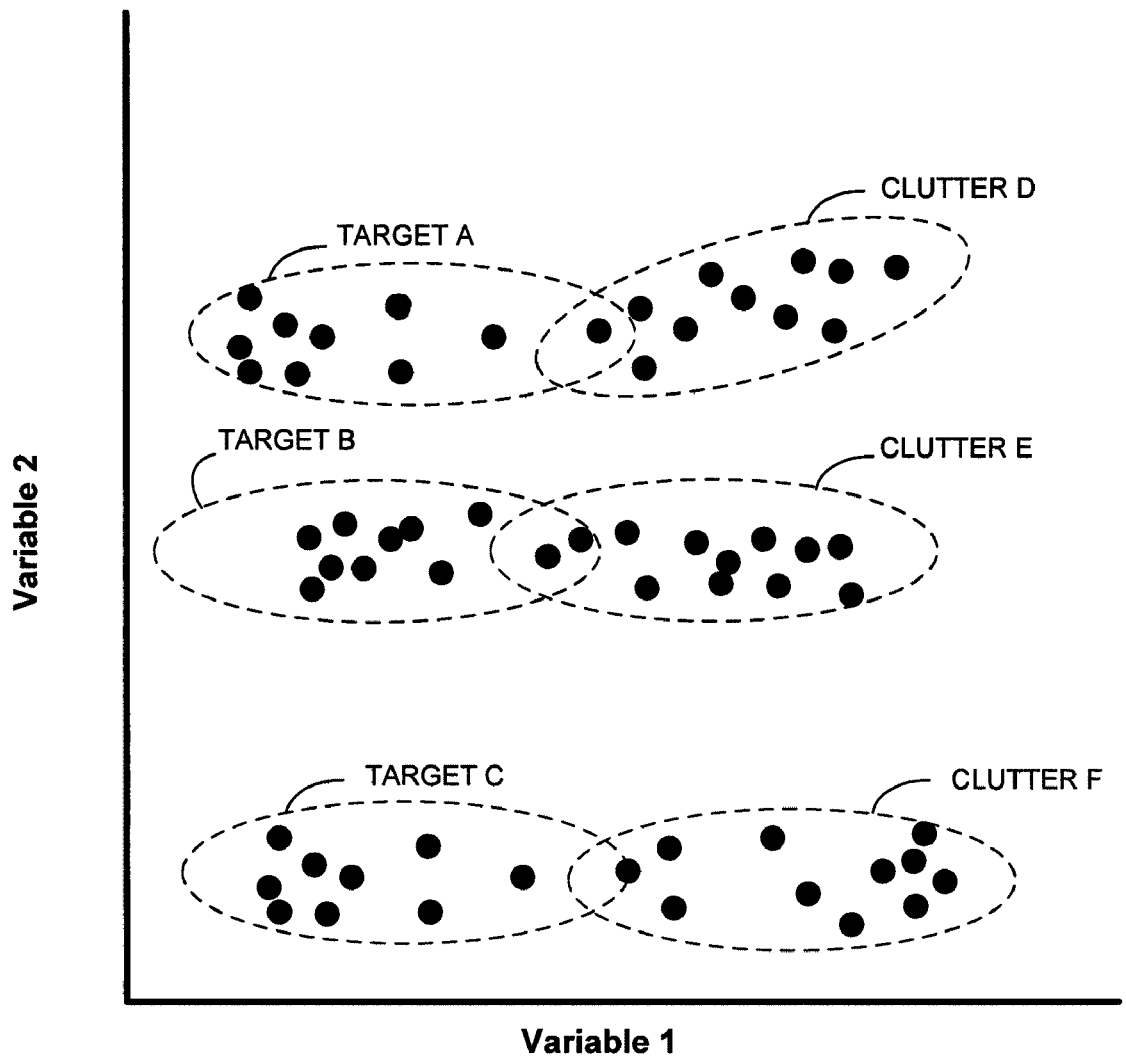
FIG. 11 is a scatter plot illustrating example feature values for multiple types of clutter and targets.

Referring also to FIG. 11, a scatter plot illustrating example feature values for target sets "A," "B," and "C" and clutter sets "E," "F," and "G" is shown. To create the scatter plot shown in FIG. 11, feature values associated with each of the targets in the three target sets and feature values associated with each of the clutter objects in the three clutter sets are plotted on a two-dimensional graph. In this example, there are three different target sets and three different clutter sets. In other examples, there may be more or fewer clutter and/or target sets, and the number of clutter sets and target sets is not necessarily the same. A target set (or clutter set) may be considered distinct from another target set (or clutter set) if the two sets do not overlap in feature space (such as the feature space shown in FIG. 11), or are less than a threshold distance apart. In the example of FIG. 11, "target A" and "target B" are considered to be distinct target types.

If the target set includes one type of target and the clutter set includes one type of clutter, the process 1000 terminates.

A target feature value is compared to a clutter feature value (1030). The types of targets and clutters that are closest to each other in the feature space represented in the scatter plot 1100 are grouped or paired together. The targets and clutter may be grouped, paired, or otherwise compared using, for example, a nearest-neighbor analysis such that a particular type of target is paired with the clutter that is nearest in feature space. In another example, all target types are grouped with all clutter types that fall within a certain distance of each other in feature space. Regardless of how the target types are grouped with the clutter types, one target type may be associated with one clutter type or multiple target types may be associated with a lesser number of clutter types (or visa versa).

The type of target is associated with the type of clutter based on the comparison (1040). As discussed above, the association may be made based on the closeness of the target type and clutter type in feature space. Referring again to FIG. 11, "target A" is associated, or paired, with "clutter D", "target B" is associated with "clutter E", and "target C" is associated with "clutter F." Although in the example shown in FIG. 11, the paired targets and clutters overlap in feature space, this is not necessarily the case. In some examples, the paired targets and clutters may be close in feature space but not necessarily overlapping. For example, clutters and targets may be paired based on being the target and clutter that are closest to each other as compared to all other possible target and clutter pairings or groupings. Closeness in feature space may be determined by a distance metric such as, for example, a Mahalanobis distance, a linear distance metric, or a nearest neighbor analysis.

Multiple classifiers are generated (1050). Each of the multiple classifiers is trained using a particular target-clutter grouping or pairing. The generated multiple classifiers may include various types of classifiers. For example, the multiple types of classifiers may include a multi-layer perceptron (MLP), a Bayesian classifier, radial basis function, Kohonen self-organizing map, a simplified fuzzy ARTMAP, and/or support vector machine (SVM).

Returning to the example of FIG. 11, "target A" and "clutter D" are used to train and generate a first classifier, "target B" and "clutter E" are used to train and generate a second classifier, and "target C" and "clutter F" are used to train and generate a third classifier. Thus, each of the generated classifiers is tuned to a particular target-clutter grouping or pairing. The classifiers each produce a confidence value or metric that indicates whether an unknown object is a target or a clutter based on a feature of the unknown object being input into the classifier. For example, the classifier that is trained on "target A" and "clutter D" data may produce a confidence of "1" (or 100%) when an unknown object having features similar to those in the "target A" set is received, indicating that the unknown object is a target. This same classifier may produce a confidence of "0.5" when an unknown object having a feature similar to that of a target in "target C" is received, indicating that the classifier has made a neutral decision as to whether the unknown object is a target. By individually training the classifiers in this manner, each of the classifiers is able to distinguish between clutters and targets that are very close in feature space. Due to their similarities, such targets and clutters may be difficult to distinguish using ordinary training techniques that do not segment the training data of clutter and/or targets into distinct types.

The trained classifiers are used to determine whether an unknown object is more likely to be a target or more likely to be clutter.

A feature value associated with an unknown object (an object that the classifiers have not encountered previously) is input to the multiple classifiers (1060). The feature value may be, for example, a ratio of vector frequencies and amplitudes as discussed above. Each of the multiple classifiers into which the feature is input produce a metric that indicates how likely it is that the unknown object is a target.

The metrics from the multiple classifiers are aggregated into an overall metric (1070). The overall metric may produce improved results as compared to techniques that determine whether an object is a target using a single classifier. The metrics may be aggregated by, for example, summing the metrics produced by each of the multiple classifiers. For example, the unknown object may be a target that is associated with a feature value similar to those of the targets in "target B." Thus, the first classifier (trained using "target A" and "clutter D") and the third classifier (trained using "target C" and "clutter F") may produce a metric that indicates that the classifier is neutral as to whether the target is a clutter or a target. The neutral metric may be "0.5" on a scale of 0 to 1. In contrast, the second classifier (trained using "target B" and "clutter E") may produce a metric that is very close to "1," indicating that the unknown object has a high likelihood of being a target. Thus, in this example, the aggregated metric is the summation of the three metrics, and is "2." An unknown object having characteristics of "clutter E" would have an aggregated metric of "1" because the second classifier would produce a metric of "0" and the first and third classifiers would each produce metrics of "0.5." As a result, the use of multiple classifiers may improve performance as compared to techniques that use only one classifier. In this example, performance is improved because the metric of the target is further separated from that of the clutter. Moreover, if the feature values for the unknown objects in this example had both been input into the first classifier only, both objects would have the exact same metric of 0.5. As a result, the objects would not be distinguishable. Accordingly, training multiple classifiers and producing an overall metric as shown in this example may provide improved performance as compared to techniques that rely on a single classifier trained on non-segmented data.

In examples in which the multiple classifiers include classifiers of more than one type, the metric produced by each classifier may be normalized to a common scale. Such a normalization allows the metrics to be aggregated together without improperly or inadvertently weighting the output of a particular classifier as compared to the output of the other classifiers.

Whether the unknown object is a target is determined based on the overall metric (1080). The unknown object may be considered to be a target if, for example, the overall metric exceeds a pre-determined threshold value.

Referring to FIGS. 12A and 12B, an example of an integrated sensor head 1200 that includes a ground penetrating radar (GPR) and continuous wave metal detector (CWMD) sensor is shown. In the example shown in FIG. 12A, the sensor head 1200 includes a CWMD that has three channels, 1210, 1220, and 1230 and a GPR 1240. The outside of the example integrated sensor head 1200 is shown in FIG. 12B. The GPR 1240 may operate in a frequency range of 700 MHz to 4 GHz to allow for potentially greater depth penetration and improved imaging performance for applications in which the sensor head 1200 is used to image a region beneath the surface of the ground. In some implementations, the sensor head 1200 may be eight inches tall "t", twelve inches wide "w", and twenty-four inches long "l." In these implementations, the sensor head 1200 may be mounted on a vehicle or cart. However, the sensor head 1200 is scalable to a larger or smaller design. For example, a smaller sensor head 1200 may be used in a handheld system. In implementations that involve a handheld system, the sensor head 1200 may be, for example, eight inches wide and eight inches tall and may include a CWMD that has a single channel rather than three channels.

Additionally, the sensor head 1200 includes a co-located CWMD and a GPR. Integrating the CWMD and GPR co-locates the CWMD and GPR in the sensor head 1200 and may allow for improved registration between detections made by, and data collected by, the CWMD and the GPR. Because the CWMD senses I&Q data, rather than just the amplitude data that is detected by a pulsed metal detector, the effects of metallic clutter are more apparent in data collected by the CWMD than in data from a pulsed metal detector. Metallic clutter includes both metallic soil and metal structural components, such as a metallic platform or metallic arm on which the sensor head 1200 is mounted, that are detectable by the CWMD. Analysis such as that discussed above with respect to FIGS. 9 and 10 allow the CWMD to be co-located with the GPR in the sensor head 1200 by identifying the metallic clutter as a non-target object.

In contrast, systems that do not include analysis such as that discussed in FIGS. 9 and 10 sometimes separate the CWMD and the GPR sensors by a distance, such as one meter, to prevent the CWMD from sensing metallic portions of the GPR. In order to prevent or minimize spurious detections from a metallic robotic arm or metallic vehicle platform on which the sensor head 1200 is mounted, some systems mounted the CWMD at a distance from the arm or platform and/or used non-metallic materials (perhaps less durable or more expensive than metal) for the arm or platform.

Moreover, although some systems may have integrated a pulsed metal detector with a GPR, because of the nature of the data collected by a CWMD, the integration of a CWMD with a GPR is different from the integration of a pulsed metal detector and a GPR. Like data collected by CWMD, data collected a pulsed metal detector reflects the presence of metallic clutter. However, because data from a pulsed metal detector is amplitude-only, rather than I&Q, the effects of the metallic clutter appear relatively constant in the data collected by the pulsed metal detector. Thus, in these systems, the presence of metallic clutter may be removed (or otherwise compensated for) by performing an analysis that, for example, removes a constant level representing the metallic clutter from metal parts of the device from the signal.

In contrast to systems that have a pulsed metal detector integrated with a GPR, removing a constant level from the I&Q data collected by a CWMD would introduce inaccuracy such that the CWMD data may be unusable to accurately discriminate between different types of objects. The effects of the metallic clutter on the I&Q data collected by a CWMD may vary based on metallic clutter in the sample being searched. For example, the metallic clutter may be a metallic soil in which an underground pipe (the target) is buried. The amount and distribution of the metal in the soil may vary slightly over a region scanned by the CWMD. The I&Q data from the CWMD reflects the variation more than amplitude data collected from a pulsed metal detector scanned over the same region. Thus, use of an analysis such as that discussed with respect to FIGS. 9 and 10 may be helpful in removing the effects of the metallic soil.

Additionally, the techniques discussed with respect to FIGS. 9 and 10 allow removal of the effect of other fixed, or semi-fixed, metal objects in the vicinity of the CWMD, such as a metallic robotic arm or a metallic platform on which the sensor 1200 is mounted. These items may be sensed by the CWMD, and removal of the effects of the sensing of these items may allow the CWMD and the GPR to be placed together in the sensor head 1200 and allow the sensor head 1200 to be held by a metallic arm.

Thus, the sensor head 1200 includes both a GPR and a CWMD. Implementations of the techniques discussed above may include a method or process, a system or apparatus, or computer software on a computer-readable medium.

What is claimed is:
1. A method comprising:
accessing a training set including a target object set and a clutter object set, the target object set including a target associated with a target feature value and the clutter object set including a non-target object associated with a clutter feature value;
determining that the training set includes multiple types of targets or multiple types of clutter;
comparing the target feature value of a type of target with the clutter feature value;
associating the type of target with the non-target object based on the comparison;
training a classifier using the target feature value and the clutter feature value of the associated type of target and the non-clutter object such that the classifier produces a metric that indicates that an object associated with the type of target is a target;

generating multiple classifiers, the multiple classifiers including the trained classifier;

applying a feature value associated with an unknown object to the multiple classifiers to generate a set of metrics for the unknown object;

aggregating the metrics into an overall metric; and determining whether the unknown object is included in the target set based on the overall metric.

2. The method of claim 1, wherein aggregating the metrics into an overall metric comprises summing the metrics included in the set of metrics.

3. The method of claim 2, wherein, prior to summing the metrics, the metrics are normalized.

4. The method of claim 1, wherein the multiple classifiers include at least two different types of classifiers.

5. The method of claim 1, wherein the clutter set includes data representing multiple different types of soils.

6. The method of claim 1, wherein the target set includes data representing multiple different types of land mines.

7. The method of claim 1, wherein comparing the target feature value of a type of target with the clutter feature value comprises determining a measure of similarity between the target feature value and the clutter feature value, and associating the type of target with the non-target object based on the comparison comprises associating the type of target and the non-target object when the measure of similarity is below a threshold value.

8. A computer-readable non-transitory medium encoded with a computer program comprising instructions that, when executed, operate to cause a computer to perform operations comprising: accessing a training set including a target object set and a clutter object set, the target object set including a target associated with a target feature value and the clutter object set including a non-target object associated with a clutter feature value;

determining that the training set includes multiple types of targets or multiple types of clutter;

comparing the target feature value of a type of target with the clutter feature value;

associating the type of target with the non-target object based on the comparison;

training a classifier using the target feature value and the clutter feature value of the associated type of target and the non-clutter object such that the classifier produces a metric that indicates that an object associated with the type of target is a target;

generating multiple classifiers, the multiple classifiers including the trained classifier;

applying a feature value associated with an unknown object to the multiple classifiers to generate a set of metrics for the unknown object;

aggregating the metrics into an overall metric; and determining whether the unknown object is included in the target set based on the overall metric.

* * * * *